(12) United States Patent
Leighton et al.

(10) Patent No.: US 9,980,608 B2
(45) Date of Patent: May 29, 2018

(54) PORTABLE FIRE PIT BARBEQUE COMBINATION

(71) Applicant: Earth's Flame, Inc., Corona, CA (US)

(72) Inventors: Lisa Leighton, Corona, CA (US); David A. Merrill, Mount Vernon, IA (US)

(73) Assignee: Earth's Flame, Inc., Corona, CA (US)

( * ) Notice: Subject to any disclaimer, the term of this patent is extended or adjusted under 35 U.S.C. 154(b) by 405 days.

(21) Appl. No.: 14/710,929

(22) Filed: May 13, 2015

(65) Prior Publication Data

US 2015/0327723 A1    Nov. 19, 2015

Related U.S. Application Data

(60) Provisional application No. 61/992,501, filed on May 13, 2014.

(51) Int. Cl.
*A47J 37/07* (2006.01)

(52) U.S. Cl.
CPC ....... *A47J 37/0713* (2013.01); *A47J 37/0704* (2013.01); *A47J 37/0731* (2013.01); *A47J 2037/0777* (2013.01)

(58) Field of Classification Search
CPC .......................... A47J 37/0731; A47J 37/0704

USPC ........................ 126/519, 551, 25 R
See application file for complete search history.

(56) References Cited

U.S. PATENT DOCUMENTS

| | | | |
|---|---|---|---|
| 6,220,240 B1 * | 4/2001 | Grady | B62B 5/06 126/276 |
| 8,528,540 B2 | 9/2013 | Marple | |
| 8,602,020 B2 | 12/2013 | Marple | |
| 9,187,108 B2 * | 11/2015 | Bruno | B62B 1/208 |
| 2005/0252504 A1 * | 11/2005 | Cabrera | A47J 37/0704 126/50 |
| 2011/0094494 A1 * | 4/2011 | Malumyan | A47J 37/0704 126/25 R |
| 2014/0076304 A1 | 3/2014 | Marple | |
| 2014/0102437 A1 | 4/2014 | Marple | |
| 2015/0168015 A1 | 6/2015 | Marple et al. | |

\* cited by examiner

*Primary Examiner* — Avinash Savani
(74) *Attorney, Agent, or Firm* — Stetina Brunda Garred and Brucker

(57) ABSTRACT

A portable device which integrates the functionalities of a fire pit and a barbecuing grill. The fire pit and grill are coupled to a transport cart to facilitate movement of the fire pit and grill to a desired location. In this respect, the transport cart may be configured to allow a user to transport the device across sand (e.g., when using the device at a beach) or across a parking lot (e.g., when using the device while tailgating in a stadium parking lot). Thus, the device easily allows for enjoyment of both a fire pit and a grill in remote locations.

19 Claims, 6 Drawing Sheets

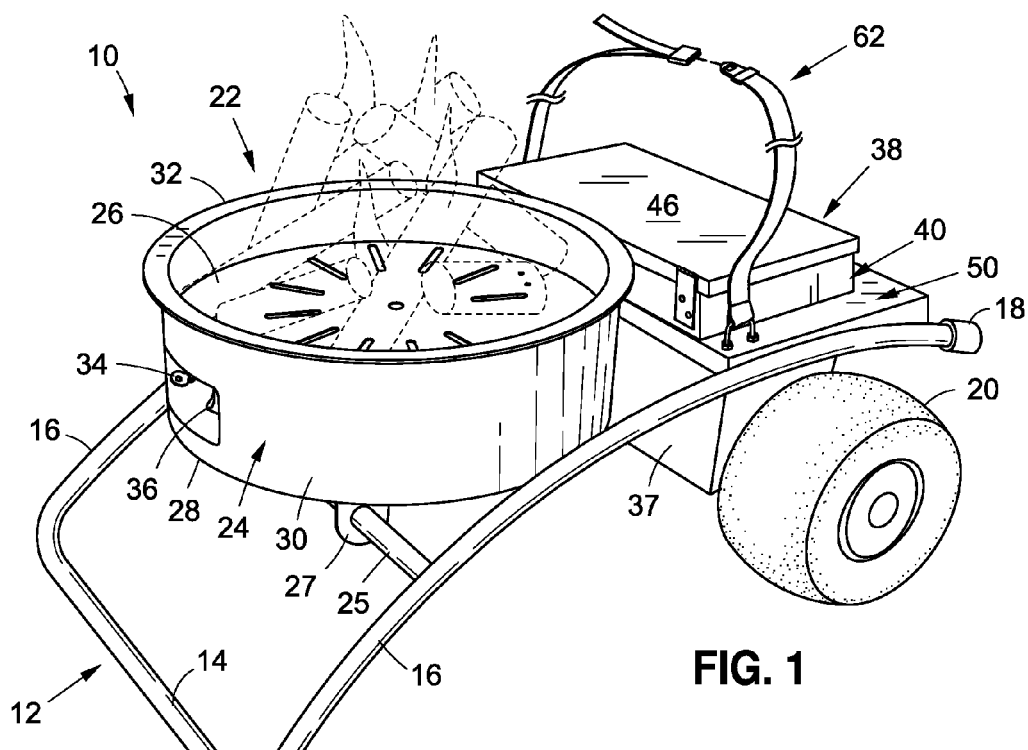

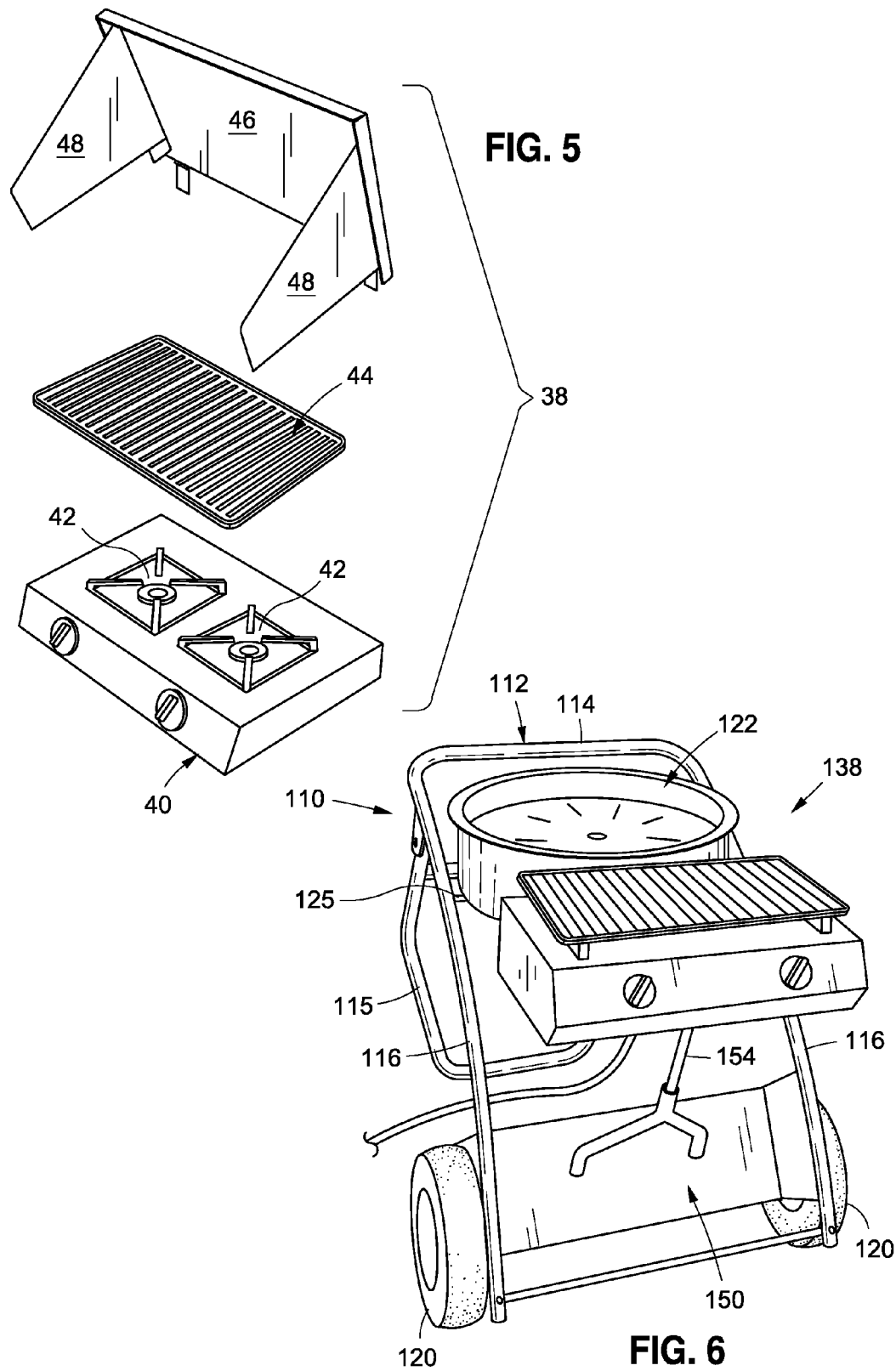

PORTABLE FIRE PIT BARBEQUE COMBINATION

CROSS-REFERENCE TO RELATED APPLICATIONS

This application claims the benefit of U.S. Provisional Application Ser. No. 61/992,501, filed May 13, 2014, the contents of which are expressly incorporated herein by reference.

STATEMENT RE: FEDERALLY SPONSORED RESEARCH/DEVELOPMENT

Not Applicable

BACKGROUND

1. Technical Field

The present disclosure relates generally to portable recreation device, and more specifically to a portable device including a fire pit and a barbecuing grill.

2. Description of the Related Art

Barbeques and campfires are two of America's favorite pastimes. Barbeques were historically hosted in one's backyard, where friends and family could gather for camaraderie and good food. After the food was prepared and consumed, it was common for the host to build a fire to provide warmth after the sun set, and to allow for roasting of marshmallows. Along these lines, the landscaping in many residential backyards is oftentimes centered around a built-in barbeque and/or fire pit.

Barbeques and recreational fires have become so engrained in the American culture that the American society has integrated barbeques and fires into their recreational activities away from home. In this respect, grilling stations have been built in public parks and beaches to allow visitors temporary use of such grilling stations during their visit. Furthermore, fire pits have been built at beaches and campsites, such that visitors of such locations may safely build a fire therein.

In addition to such permanent grills and fire pits in public locations, several portable grills have been developed. An exemplary portable grill is a small kettle grill which is a charcoal grill, which is of a small form factor to allow for ease of transport. Another exemplary portable grill is often referred to as a "camping grill" which is a propane grill having a small, thin burner connectable to a small, portable, propane tank, with the burner being housed within a small grill housing. The camping grill may be placed in the trunk of a vehicle and transported to a campsite.

In addition to portable grills, portable fire pits have been developed which allow for enjoyment of a fire without a permanent fire pit. Such portable fire pits generally include a hollow metallic chamber within which wood may be placed for fueling a fire. In this respect, as the wood burns, any cinders or ash may remain in the metallic chamber. Due to the containment of any debris from the fire, portable fire pits have been used not only as an alternative for enjoying a fire remote from one's residence, but also in one's own backyard. The portability of the unit also allows the device to be stowed in a garage or storage shed when not being used.

Although portable grills and portable fire pits remain popular, they are typically sold as separate units, which makes it difficult to transport both to a remote location.

Accordingly, there is a need in the art for a portable device which integrates the functionalities of both a conventional barbecuing grill and a fire pit. Various aspects of the present disclosure address this particular need, as will be discussed in more detail below.

BRIEF SUMMARY

In accordance with one embodiment of the present disclosure, there is provided a portable device which integrates the functionalities of a fire pit and a barbecuing grill. The fire pit and grill are coupled to a transport cart to facilitate movement of the fire pit and grill to a desired location. In this respect, the transport cart may be configured to allow a user to transport the device across sand (e.g., when using the device at a beach) or across a parking lot (e.g., when using the device while tailgating in a stadium parking lot). Thus, the device easily allows for enjoyment of both a fire pit and a grill in remote locations.

According to one embodiment, there is provided portable gas burning multi-function recreation device a frame having a handle portion and two lateral support portions, and a pair of wheels coupled to the frame. A fire pit is coupled to the frame and is positioned between the two lateral support portions of the frame, the fire pit being fluidly connectable to a gas supply for generating a fire. A grill is connected to the frame and adapted for grilling food.

The device may additionally include a frame support pivotally coupled to the lateral support portions of the frame and transitional relative thereto between a stowed position and a deployed position, a portion of the frame support moving away from the lateral support portions as the frame support transitions from the stowed position toward the deployed position.

The fire pit may be pivotally coupled to the frame. The frame may be transitional between a lowered position, with the handle portion and the pair of wheels resting on an underlying support surface, and a raised position, with the handle portion raised off the underlying support surface and the pair of wheels remaining on the underlying support surface. Transition of the frame between the lowered position and the raised position may urge the fire pit to pivot relative to the frame. A locking element may be coupled to the fire pit and the frame, with the locking element being adapted to selectively prevent pivotal movement of the fire pit relative to the frame.

The grill may be positioned over the fire pit such that heat from the fire pit is used from grilling food. The grill may be moveable relative to the fire pit between a first position and a second position, with the grill moving away from the fire pit as the grill moves from the first position toward the second position.

The fire pit may include a fire pit body defining a fire pit periphery, and the grill may be spaced from and positioned outside of the fire pit periphery. The grill may be fluidly connectable to the gas supply.

The device may further comprise a shelf configured to be selectively attachable to the frame and adapted to support a gas tank.

The device may additionally include an ignitor adapted to ignite gas for generating the fire in the fire pit.

The device may further comprise a gas supply hose coupled to the fire pit and connectable to the gas supply. A gas control valve may be in fluid communication with the gas supply hose and operative to control the supply of gas to the fire pit. The gas control valve may be adapted to restrict gas flow to the fire pit automatically in response to the fire pit being inclined relative to the horizontal by a prescribed amount.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which:

FIG. 1 is a front upper perspective view of a multi-function recreation device including a fire pit and a grill attached to a portable frame, the device being shown in a lowered position;

FIG. 2 is a rear upper perspective view of the device depicted in FIG. 1, with the grill shown in a lowered position;

FIG. 5 is an exploded upper perspective view of the grill;

FIG. 6 is an upper perspective view of a second embodiment of a multi-function recreation device including a fire pit and a grill attached to a portable frame;

Common reference numerals are used throughout the drawings and the detailed description to indicate the same elements.

DETAILED DESCRIPTION

Figure 3:
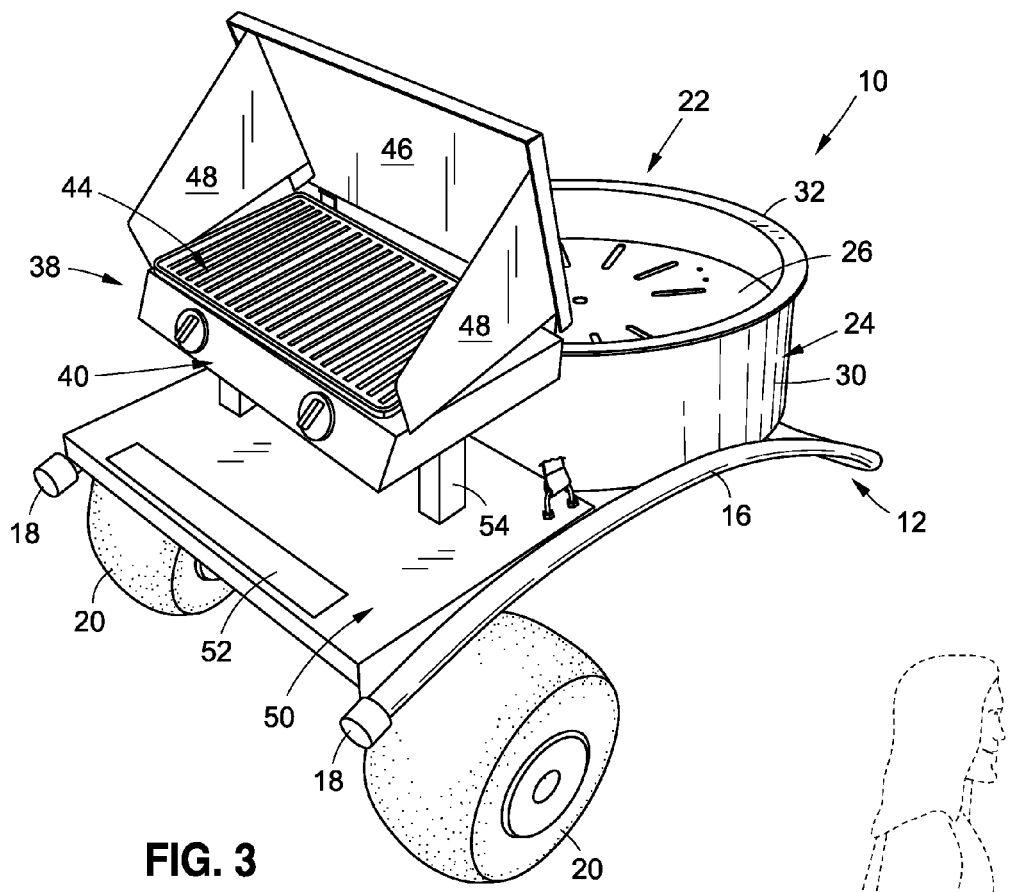
FIG. 3 is a rear upper perspective view of the device, with the grill shown in a raised position.
Figure 4:
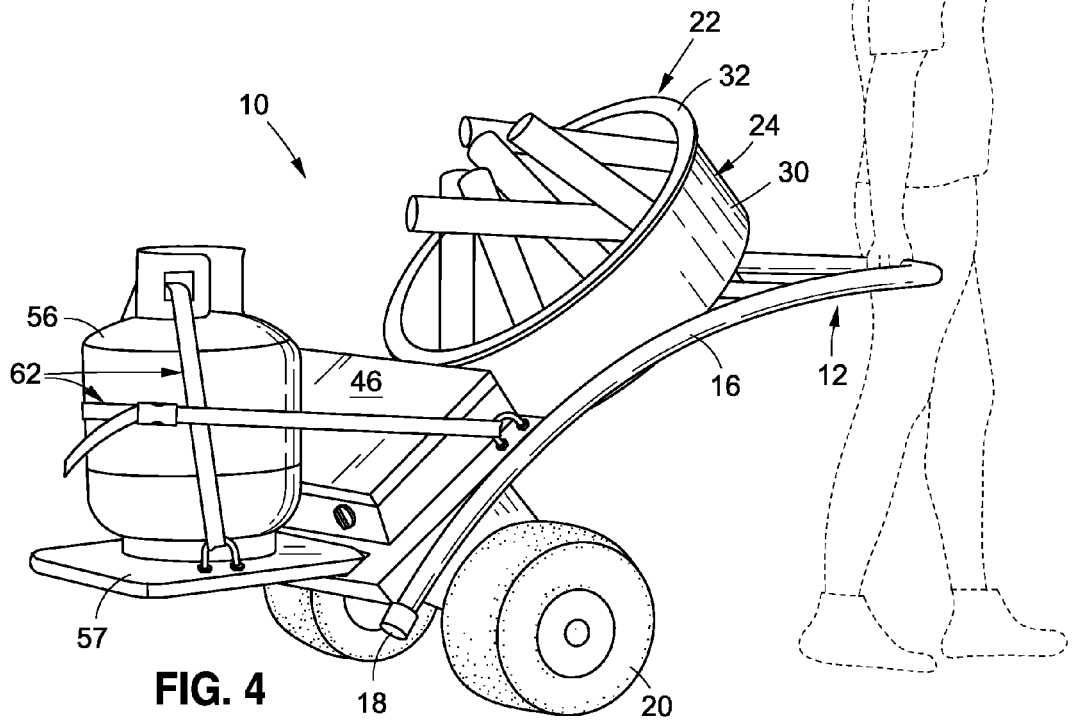
FIG. 4 is a front upper perspective view of the device in a raised position relative the position shown in FIGS. 1-3, with a user shown in phantom pulling the device.
Figure 7:
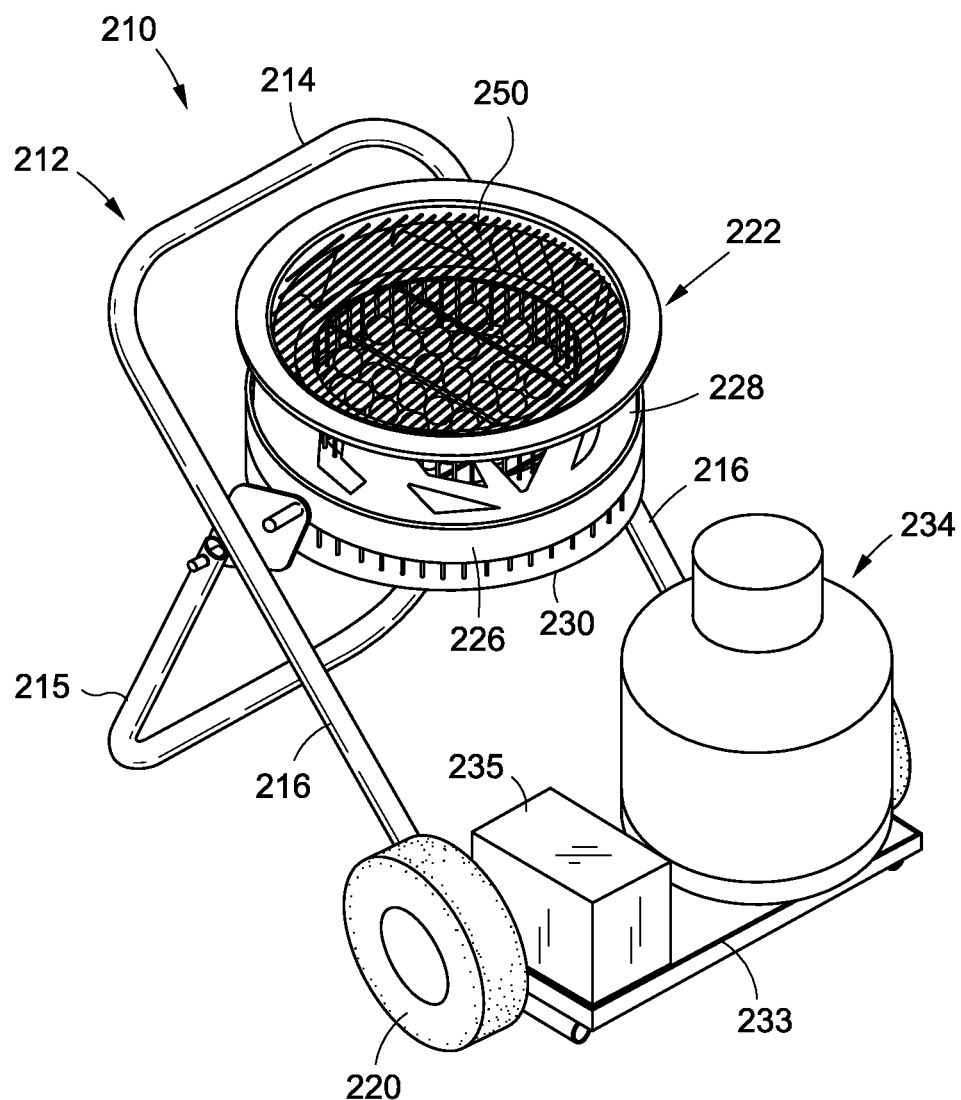
FIG. 7 is an upper perspective view of a third embodiment of a multi-function recreation device including a fire pit and a grill attached to a portable frame.
Figure 8:
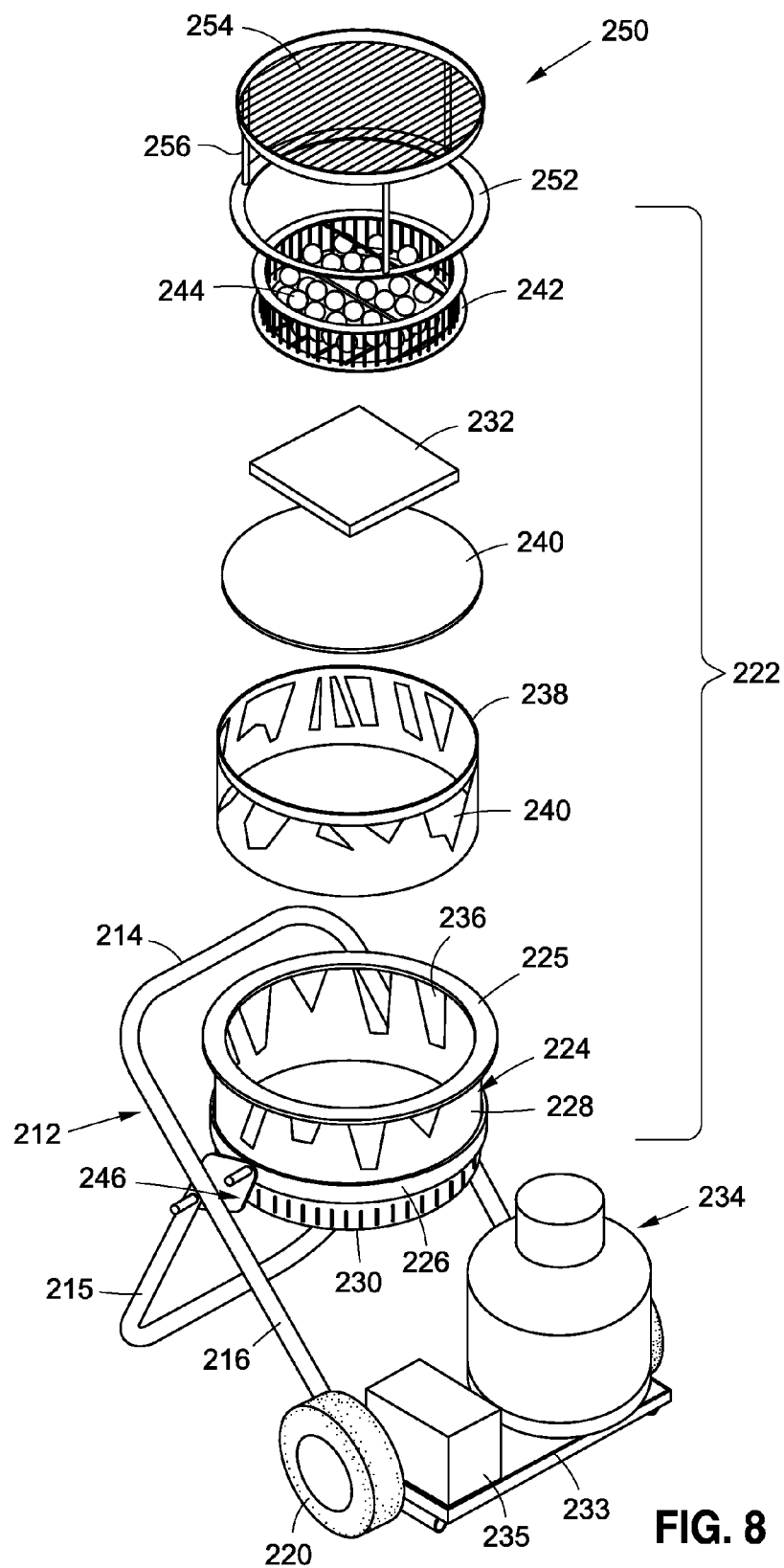
FIG. 8 is an upper perspective, partial exploded view of the device depicted in FIG. 7.
Figure 9:
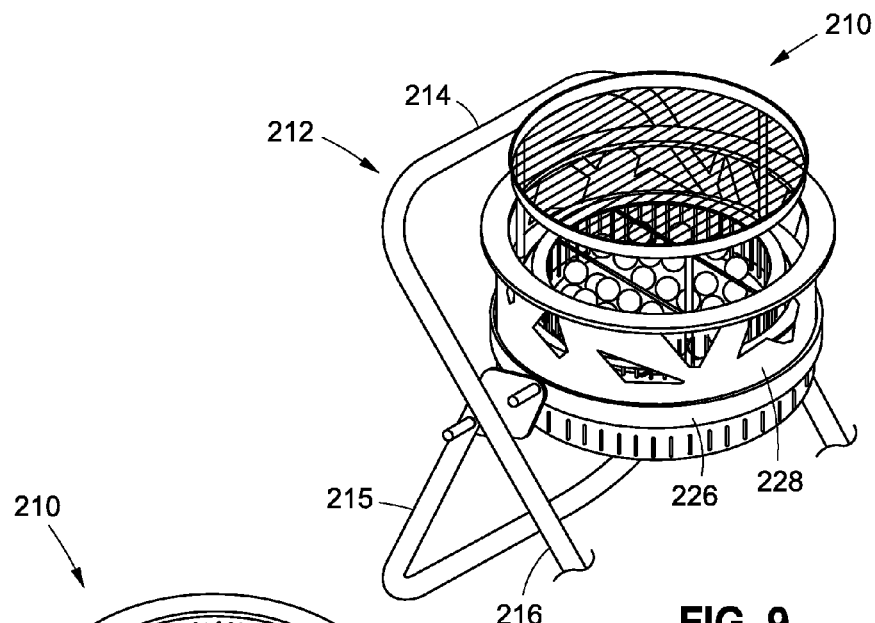
FIG. 9 is a partial upper perspective view of the device depicted in FIG. 7, with the grill in a raised position and the frame in a deployed position.

The detailed description set forth below in connection with the appended drawings is intended as a description of certain embodiments of a combination fire pit and barbeque and is not intended to represent the only forms that may be developed or utilized. The description sets forth the various structure and/or functions in connection with the illustrated embodiments, but it is to be understood, however, that the same or equivalent structure and/or functions may be accomplished by different embodiments that are also intended to be encompassed within the scope of the present disclosure. It is further understood that the use of relational terms such as first and second, and the like are used solely to distinguish one entity from another without necessarily requiring or implying any actual such relationship or order between such entities.

Referring now to the drawings, wherein the showings are for purposes of illustrating preferred embodiments of the present disclosure, and are not for purposes of limiting the same, there is depicted a combination fire pit and barbecuing grill integrated into a single portable unit. The integrated design allows a user to enjoy the benefits of both a fire pit, as well as a grill. The unit may be particularly configured for ease of transport for use and enjoyment in remote locations, such as at the beach, a campsite, or a stadium parking lot.

FIGS. 1-5 depict a first embodiment of the integrated device 10 (i.e., a portable gas burning multi-function recreation device), which includes a rigid, durable frame 12 having a handle portion 14 and two lateral portions 16 extending from respective ends of the handle portion 14 and terminating at respective lateral ends, which may be covered by an end cap 18. The lateral portions 16 may define an arcuate configuration, or alternatively, a generally linear configuration. As will be described in more detail below, the frame 12 may be selectively transitional between a lowered position and a raised position relative to an underlying support surface (e.g., the beach, a parking lot, a sidewalk, etc.). The arcuate configuration of the lateral portions 16 allows the fire pit and/or grill to be raised above the underlying support surface, when the device 10 is in the lowered position. The frame 12 may be formed from metal or other suitable materials capable of supporting the fire pit and grill.

The frame 12 additionally includes an axle mount adjacent the ends of the lateral portions 16, with the axle mount being adapted to support an axle rotatable within the axle mount. A pair of wheels 20 is coupled to the axle, with each wheel 20 being coupled to a respective end of the axle so as to provide ease of mobility for the device 10. The combination of the frame 12 and wheels 20 defines a portable buggy or trolley for easily transporting the fire pit and grill. It is contemplated that different types of wheels 20 may be used on the device 10, depending on the environment in which the device 10 will be used. For instance, wheels 20 having balloon tires may be used if the device 10 is intended to be used on sand (e.g., at the beach), as the balloon tires are generally wider and are inflated to a lower pressure. As such, balloon tires are able to conform to the irregular surface of the sand and distribute the load to make it easier to traverse over the sand and other obstacles, which may be present on the sand, such as branches, etc. However, it is also contemplated that more rigid tires, which are typically narrower and are inflated to a higher pressure than balloon tires, may be used if the device 10 is intended to be used on a more rigid surface, such as a paved parking lot or sidewalk. Along these lines, since different tires may be preferable in different environments, the wheels 20 may be coupled to the axle in a manner, which allows the wheels 20 to be easily swapped out.

The device 10 further includes a fire pit 22 coupled to the frame 12. The fire pit 22 may be any structure capable of having a fire burned therein, and as such, in its most basic form, the fire pit 22 may include a fire-resistant (e.g., metal) tub. Referring now to the exemplary embodiment, the fire pit 22 generally includes a fire pit body 24 and a fire pit burner 26. The fire pit body 24 includes a base wall 28 and a peripheral wall 30 defining a fire pit outer periphery. The peripheral wall 30 and base wall 28 collectively define a recess within which the burner 26 is at least partially received. The fire pit 22 may further include an upper flange 32 coupled to the upper rim of the peripheral wall 30 and extending radially outward therefrom. As shown in the exemplary embodiment, the fire pit 22 is generally circular, although those skilled in the art will readily appreciate that in other embodiments, the fire pit 22 may define any shape or configuration, such as an oval, triangle, quadrangle, etc. In one embodiment, the fire pit body 24 is formed from a metallic material, although other materials known in the art may also be used.

The burner 26 is coupled to a gas supply, as will be described in more detail below, and is adapted to deliver gas for ignition so as to generate a fire. The burner 26 may take on various shapes and configurations, depending on the desired look, as well as the shape of the fire. In the exemplary embodiment, the burner 26 includes a plate having a plurality of openings through which the gas/flames may dissipate. A stack of fake logs may be placed over the burner plate to mimic a wood-burning fire. In other another embodiment, the burner 26 itself may be shaped similar to a stack of logs or twigs, with the fire emanating from the logs. Alternatively, the burner 26 may include a several elongate metal tubes, arranged in an artful fashion. Thus, those skilled in the art will appreciate that the burner 26 may be any device capable of delivering a fuel for burning to create the fire. The fire pit 22 may further include lava rocks, fire glass, gems, nuggets, ceramic logs, stones, river rocks or other elements known in the art for enhancing the overall look or aesthetics of the fire.

According to one embodiment, the fire pit 22 is coupled to the frame 12 such that the peripheral wall 30 resides between the opposed pair of lateral portions 16 of the frame 12, so as to provide stability to the device 10. In particular, the outer diameter of the peripheral wall 30 is less than the distance between the opposed lateral portions 16 of the frame 12. In the exemplary embodiment, the fire pit 22 is coupled to the frame 12 via a mounting bar 25 and a mounting bracket 27, which immovably couples the fire pit 22 to the frame 12. However, it is contemplated that in other embodiments, the fire pit 22 may be coupled to the frame 12 to enable a certain degree of pivotal movement of the fire pit 22 relative to the frame 12.

The fire pit 22 may include a safety switch and a built-in igniter 36 for igniting the fire pit 22. The safety switch may be controlled via a key 34, which may be removed during periods of non-use to prevent a child from activating the fire pit 22. The safety switch controls the supply of gas from the gas supply to the burner 26. In this respect, gas may only be supplied to the burner 26 when the key 34 is placed in the safety switch and the key 34 is turned to an "ignite" position. With the key 34 in the "ignite" position, the igniter 36 may be actuated to ignite a flame in the fire pit 22. When the fire pit 22 is turned off (by shutting off the gas supply), the key 34 may be turned to the "off" position, and the key 34 may be removed to prevent the fire pit 22 from being inadvertently activated. The igniter 36 may be coupled to a rechargeable battery pack 37 to provide electricity necessary for electronic ignition.

Although the exemplary embodiment includes a gas powered fire pit 22, it is contemplated that fire pits which include fuels other than gas may also be used without departing from the spirit and scope of the present disclosure. For instance, the fire pit 22 may be a wood burning fire pit, a charcoal burning fire pit, or other fuel burning fire pits known by those skilled in the art.

In addition to the fire pit 22, the device 10 further includes a grill 38 coupled to the frame 12 to allow a user to grill food thereon. According to various aspects of the present disclosure, the grill 38 may be located next to the fire pit 22 or alternatively, over the fire pit 22, without departing from the spirit and scope of the present disclosure.

Referring to the embodiment depicted in FIGS. 1-5, the grill 38 is coupled to the frame 12 and is located beside the fire pit 22. In this respect, the grill 38 is not located over the fire pit 22 (e.g., the grill 38 is spaced from the outer periphery of the fire pit periphery). The grill 38 includes a grill body 40 and one or more grill burners 42. The exemplary grill 38 includes a pair of burners 42, each being fluidly connectable to the gas supply and adapted to individually and selectively regulate the amount of gas emitted by each burner 42 to control the temperature of the burner 42 when the burner 42 is ignited. It is contemplated that the burner(s) 42 may be used in a conventional fashion (e.g., with a pan placed on the burner 42) or in connection with a griddle 44, which may be adapted to fit over the burner(s) 42 to heat the griddle 44. The griddle 44 may include a generally flat cooking surface on one side, as may be desirable for cooking eggs, etc., and a ribbed cooking surface on an opposite side, as may be desirable for cooking hot dogs, sausage, etc. The griddle 44 and grill body 40 may be configured to allow the griddle 44 to become nested within the grill body 40 when the griddle 44 is placed over the burner(s) 42.

The grill 38 may further include a lid 46, which is pivotally connected to the grill body 40 and is selectively transitional between a closed position (see FIGS. 1 and 4) and an open position (see FIGS. 2 and 3). In the closed position, the lid 46 extends over the burner(s) 42 to cover the burner(s) 42 when the grill 38 is not being used. The lid 46 may be transitioned to the open position to uncover the burner(s) 42 (or griddle 44) to allow for use of the grill 38. A pair of side panels 48 may be used in connection with the lid 46 when the lid 46 is in the open position to block wind and prevent grease or the like from inadvertently contacting someone located on the side of the grill 38. The side panels 48 may be pivotally coupled to the lid 46 such that when the lid 46 is in the closed position, the side panels 48 may be folded toward the inside surface of the lid 46 to assume a generally co-planar or parallel relationship with the lid 46. However, when the side panels 48 are deployed, the side panels 48 may assume a generally perpendicular relationship relative to the lid 46. It is also contemplated that the side panels 48 may be separate or detached from the lid 46 (i.e., not pivotally coupled to the lid 46), and simply rest between the lid 46 and the grill body 40 when the lid 46 is in the open position. Along these lines, the side panels 48 may include a tab that fits within a corresponding slot (not shown) formed within lid 46 to secure the side panels 48 in place when the lid 46 is in the open position.

The device 10 may include a grill support panel 50 coupled to the frame 12 and adapted to support the grill 38. As shown in FIGS. 1-4, the grill support panel 50 includes a metal sheet coupled to, and extending between, the pair of lateral portions 16 of the frame 12. The grill support panel 50 may include an elongate slot 52 formed therein, the purpose of which will be described in more detail below. The grill 38 may be fixedly secured to the grill support panel 50 such that the grill 38 remains on the grill support panel 50 during use. In an alternate embodiment, the grill 38 is coupled to the grill support panel 50 via one or more telescoping support legs 54 (see FIG. 3), which allow the grill 38 to be selectively raised and lowered relative to the support panel 50, as desired. For instance, when the grill 38 is not being used, it may be desirable to keep the grill 38 in the lowered position. The grill 38 may be transitioned to the raised position to allow the user to more easily reach the grill 38 when standing.

According to one embodiment, the fire pit 22 and the grill 38 are adapted for use with natural gas or propane, which may be ignited to create the fire in the fire pit 22 and the heat for the grill 38. The natural gas or propane may be supplied by a gas supply 56, such as a conventional gas tank. The gas tank 56 may be fluidly connected to a gas hose 58, which may be split to service both the fire pit 22 and the grill 38. According to most embodiments, the hose 58 may range from 3-25 feet, such that hoses 58 that are greater in length provide more adaptability in placement of the gas tank 56 relative to the fire pit 22 or grill 38. The device may further include a control valve 60 for controlling the supply of gas from the gas tank 56 to the burner 26 of the fire pit 22 and/or the burner 42 of the grill 38. In particular, the control valve 60 may be adapted to assume a closed position (thereby preventing the flow of gas to the fire pit burner 26 or grill burner 42), when the frame 12 is lifted from the lowered position to the raised position. For instance, the control valve 60 may include an inclinometer such that when the frame 12 is raised a prescribed amount, such as approximately 15 degrees relative to the horizontal, the control valve 60 automatically shuts off the supply of gas. This is a safety feature to shut off the fire pit 22 and/or the grill 38 to prevent injury or damage when the device 10 is being moved. The amount of inclination which may cause the control valve 60 to automatically close may be anywhere in the range of 5-45 degrees. The control valve 60 may be integrated into the fire pit 22 or grill 38, or alternatively, may be disposed in the gas hose 58 adjacent the fire pit 22 or grill 38 such that the valve 60 will be able to detect inclination of the fire pit 22 or grill 38 when the device 10 is raised.

The gas tank 56 may be supported by a shelf or tray 57 adapted to be partially received within an elongate slot 52 formed in the grill support panel 50. The shelf or tray 57 may include a lip or collar (not shown) extending upwardly from one side and adapted to engage with the gas tank 56 when the gas tank 56 is placed on the tray 57 so as to center the tank 56 on the tray 57 and prevent the tank 56 from sliding off the tray 57 should the tray 57 become inclined when the frame 12 is transitioned between the raised and lowered positions, or when the device 10 is being moved on its wheels 20. Along those lines, the device 10 may further include one or more securing straps 62 attached to the frame 12, grill support panel 50, or tray 57, with the securing strap 62 being extendable around the gas tank 56 to more effectively secure the gas tank 56 in place on the tray 57.

With the basic structural features of the device 10 described above, the following describes an exemplary use of the device 10. The device 10 may be loaded into a vehicle for transportation to a remote destination. For gas burning devices, the gas tank 56 may remain on the tray 57 or removed from the tray 57 and placed in vehicle, depending on the size of the vehicle. The form factor of the device 10 is such that the device 10 may fit into the trunk of most vehicles and may be loaded by a single individual. According to one embodiment, the device 10 may define a collapsed height of approximately 12 inches. After arrival at the destination, the device 10 may be unloaded from the vehicle. If the gas tank 56 did not remain on the tray 57 when the device 10 was in the vehicle, the gas tank 56 may be loaded on the tray 57 before transporting the device 10. The device 10 is then transitioned to the raised position, such that the handle portion 14 is elevated for ease of gripping by the user, and the device 10 may be easily pushed or pulled to its final destination.

Once the device 10 reaches the final destination, whether such destination is a beach, camping spot, stadium parking lot, or in a backyard, the device 10 may be transitioned to the lowered position by lowering the handle 14 until it reaches the ground. With the device 10 lowered, the device 10 is ready for use. In this regard, the gas tank 56 may be connected to the gas hose 58 which supplies gas to the fire pit 22 and the grill 38.

If the user wants to use the fire pit 22, the user opens the gas tank 56 such that gas is supplied to the fire pit 22 from the tank 56. The user then inserts the safety key 34 and turns the safety key 34 toward an "ignite" position, and presses the ignition switch 36, which activates an electronic igniter to ignite a flame. The fire pit 22 remains lit until one of the following conditions occurs: 1) the gas tank 56 is turned off, which ceases the supply of gas to the fire pit 22; 2) the device 10 is lifted, which is sensed by the inclinator and the safety valve 60 is closed; 3) the gas tank 56 runs out of gas; or 4) the safety key 34 is turned "off."

If the user wants to use the grill 38, the user may raise the grill 38 by pulling up on the grill 38, which in turn causes the telescoping legs 54 to extend. When the legs 54 are fully extended, the legs 54 may lock on the extended position to keep the grill 38 in the raised position. The user then raises the lid 46 and positions the side panels 48 in place. The user then ensures that the gas supply 56 is turned on. In this regard, it is contemplated that the device 10 may be configured to allow for simultaneous use of the fire pit 22 and grill 38. However, it is also contemplated that other embodiments may be configured such that only one of the fire pit 22 and grill 38 may be used. In either case, if the user wants to use the grill 38, the user must ensure that the gas supply 56 is open and is providing gas to the grill 38. The user then turns one of the dials on the grill to an "ignite" position and presses an ignition switch to ignite the grill burner 42. The user may then regulate the amount of heat supplied by the grill 38 by turning the dial to the appropriate position. The grill 38 will remain ignited until one of the following conditions occurs: 1) the gas tank 56 is turned off, which ceases the supply of gas to the grill 38; 2) the device 10 is lifted, which is sensed by the inclinator and the safety valve 60 is closed; 3) the gas tank 56 runs out of gas; or 4) the dials on the grill 38 are turned off.

When the user is done grilling, the user ensures that the gas has been turned off by closing the gas tank 56 and turning the dials to the "off" position. The user then closes the lid 46 and places the side panels 48 under the lid 46, between the lid 46 and the grilling surface. The grill 38 may then be lowered from its raised position by unlocking the telescoping legs 54 and allowing the grill 38 to be lowered. The device 10 may be wheeled back to the user's vehicle and placed therein for transport.

Referring now to FIG. 6, there is depicted another embodiment of a device 110 which integrates the functionalities of a fire pit and a barbequing grill. The primary distinction between the device 110 shown in FIG. 6 and the device 10 shown in FIGS. 1-5 pertains the ability of the fire pit and grill to be used when the frame is in the raised position, as will be described in more detail below.

The device 110 includes a fire pit 122, a grill 138 and a pair of wheels 120 similar to those in the device 10 shown in FIGS. 1-5. As such, for a more detailed discussion of the fire pit 122, grill 138 and wheels 120, please refer to the foregoing discussion. The following discussion of the device 110 will focus on the unique features thereof.

One unique feature of the device 110 relates to the frame 112. In particular, the frame 112 includes a handle portion 114 and a pair of opposed lateral portions 116, similar to the frame 12 discussed above; however, the frame 112 additionally includes a pivotal frame support 115 coupled to the pair of opposed lateral portions 116. The pivotal frame support 115 is adapted to support the device 110 when the frame 112 is in a generally upright position. The pivotal frame support 115 is transitional between a stowed position and a deployed position. As shown in FIG. 6, the frame support 115 is in the deployed position. As the frame support 115 transitions from the stowed position toward the deployed position, the frame support 115 moves away from the lateral portions and the angle between the laterals portions 116 and the frame support 115 increases. Conversely, as the frame support 115 transitions from the deployed position toward the stowed position, the frame support 115 moves toward the laterals portions 116 and the angle between the lateral portions 116 and the frame support 115 decreases. The frame support 115 may be placed in the stowed position to collapse the frame 112 to make it easier to fit the device 110 in a vehicle during transport.

Another unique feature of the device 110 is the connection of the fire pit 122 and grill 138 to the frame 112. In particular, the fire pit 122 and grill 138 are coupled to each other and are pivotal relative to the frame 112 between a first position and a second position. As shown in FIG. 6, the fire pit 122 and grill 138 are in the first position, with the fire pit 122 and grill 138 assuming a generally horizontal position when the frame 112 is in a generally upright configuration. When the fire pit 122 and grill 138 are in the first position and the frame 112 is in an upright position and supported by the frame support 115, the grill 138 is at a preferred height (relative to the ground) for use, e.g., the grill dials and grilling surface are easily accessible by a user. When the fire pit 122 and grill 138 are transitioned from the first position toward the second position, the grill 138 is moved toward a lower support panel 150. Since the fire pit 122 is coupled to the grill 138, the fire pit 122 will pivot with the grill 138 as the grill 138 moves toward the support panel 150. In this respect, the fire pit 122 may be pivotally coupled to the lateral portions 116 of the frame 112 via a pivot bar 125 to allow pivotal movement of the fire pit 122 relative to the frame 112.

A grill support leg 154 may extend between the support panel 150 and the grill 138 to support the grill 138 when the grill 138 is in the elevated first position. The grill support leg 154 may be configured to allow the grill 138 to transition between the first position and the second position. Along these lines, the support leg 154 may include a hinge which allows the support leg 154 to collapse as the grill 138 is moved from the first position toward the second position. Alternatively, the support leg 154 may be translatably coupled to the underside of the grill 138, such that as the grill 138 moves between the first and second positions, the support leg 154 slides relative to the grill 138.

With regard to use of the device 110 shown in FIG. 6, such use is similar to the use of the device 10 described above, with the primary difference being the use of the frame support 115 and support leg 154. In particular, when placing the device 110 in the vehicle, the frame support 115 is preferably in the stowed position, and the fire pit 122 and grill 138 are preferably in the second position, i.e., the grill 138 being disposed adjacent the support panel 150. After arriving at the destination, the device 110 may be wheeled to the desired location with the frame support 115 remaining in the stowed configuration and the fire pit 122 and grill 138 remaining in the second position. Once the device 110 has been wheeled to the desired location, the frame support 115 may be transitioned to the deployed position and the fire pit 122 and grill 138 may be transitioned to the first position for use. After use, the device 110 can be collapsed by transitioning the frame support 115 from the deployed position toward the collapsed position, and the grill 122 and fire pit 138 from the first position to the second position for transport or storage.

Figure 10:
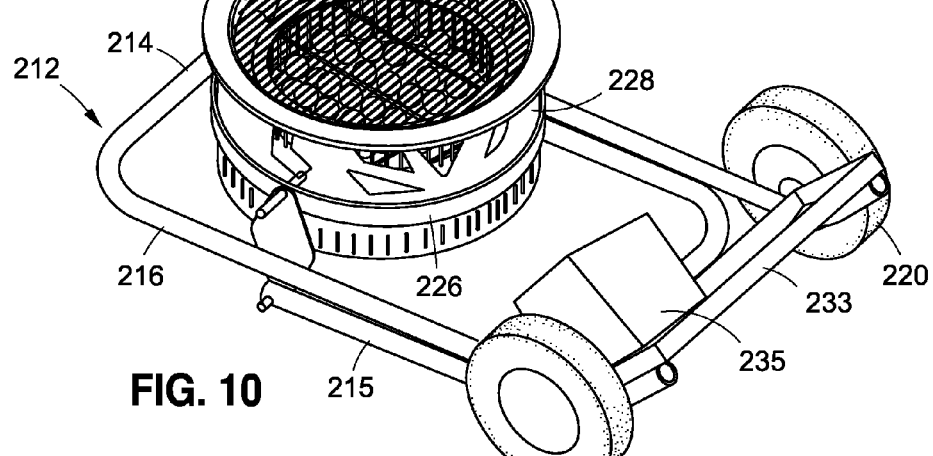
FIG. 10 is an upper perspective view of the device depicted in FIG. 7, with the frame in a stowed position and the grill in a lowered position.
Figure 11:
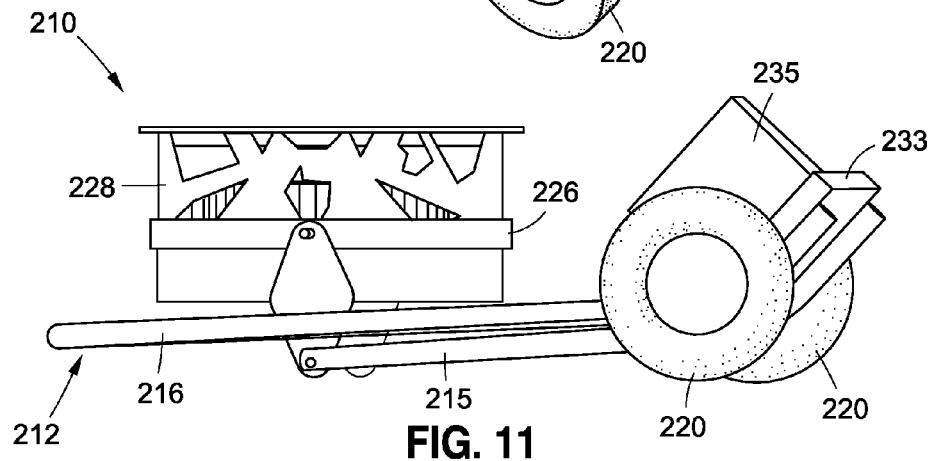
FIG. 11 is a side view of the device as depicted in FIG. 10.

Referring now to FIGS. 7-11, there is depicted yet another embodiment of the device 210. A distinctive feature of the device 210 depicted in FIG. 11 is that the fire pit and grill share a common heat source. In this respect, grill is not entirely located outside of the outer periphery of the fire pit, as is the case with the embodiments depicted in FIG. 1-6. Rather, the grill may reside over the fit pit to use heat from the fire pit to cook food on the grill.

The device 210 includes a frame 212 similar to the frame 112 shown in the embodiment depicted in FIG. 6, with the frame 212 including a handle portion 214, a pair of lateral portions 216, and a frame support 215 pivotally coupled to the lateral portions 216 and transitional between a deployed position (see FIGS. 7-9) and a stowed position (see FIGS. 10-11). A pair of wheels 220 are coupled to the frame 212 to facilitate movement of the device 210.

A fire pit 222 is coupled to the frame 212 and includes a fire pit body 224. The fire pit body 224 may be pivotally secured to the frame 212 via a retaining ring 226. The fire pit body 224 includes a sidewall 228 and a base wall 230 defining a fire pit recess, which receives a fire pit burner 232. The burner 232 is fluidly connectable to a gas supply 234 via a supply hose (not shown). The gas supply 234 may include a gas tank which resides on a shelf 233 coupled to the frame 212. The burner 232 may be in communication with an igniter assembly 235 including a battery pack for electronic ignition of the burner 232. The sidewall 228 may include one or more cutouts 236 formed therein. A ring insert 238 may be used in connection with the fire pit body 224, with the ring insert 238 including openings 240 which may be selectively registered or aligned with the cutouts 236 formed in the sidewall 228. In this respect, the user may selectively vary the size of the openings by rotating the ring insert 238 relative to the sidewall 228. Such variation may be desirable to control the amount of air supplied to the fire (which may be more desirable for fire pits which do not use gas, e.g., wood-burning fire pits).

The fire pit 222 may additionally include an insert plate 240 to space the burner 232 from the bottom of the fire pit body 224. A basket 242 may be placed in the fire pit 222 and may be adapted to receive a plurality of coals or heat retaining bricks 244, which may be advantageous when grilling.

According to one embodiment, the device 210 includes a locking element 246 coupled to the fire pit 222 and the frame 212, with the locking element 246 being adapted to selectively prevent pivotal movement of the fire pit 222 relative to the frame 212. The locking element 246 may include a locking pin which may be inserted through a first opening formed on the frame 212 and a second opening formed on the retaining ring 226 so as to "lock" the fire pit body 224 in place relative to the frame 212.

The grill 250 is adapted to be placed on top of the fire pit 222 to use the heat generated by the fire pit 222 to cook food on the grill 250. The grill 250 includes a base ring 252 and a grill element 254 coupled to the base ring 252. The base ring 252 may be connectable to the fire pit body 224, specifically an upper flange 225 of the fire pit body 224. The base ring 252 may be received within a recess formed in the upper flange 225, or may be coupled to the upper flange 225 using other techniques known by those skilled in the art. The grill element 254 may be transitional relative to the base ring 252 between a lowered position and a raised position so as to control the amount of heat received at the grill 250. For instance, the grill element 254 may be coupled to the base ring 252 by a plurality of telescoping elements 256 which allow a user to selectively vary the distance between the grill element 254 and the base ring 252.

In use, a user may use the fire pit 222 alone without the grill 250 by removing the grill 250 from the top of the fire pit 222. When the fire pit 222 is used alone, the basket 242 may be removed. The user may adjust the placement of the ring insert 238 relative to the sidewall 228 of the fire pit body 224 to adjust the side of the openings on the side of the fire pit 222. As noted above, the fuel for the fire in the fire pit 222 may be supplied by the gas tank 234, or may be some other fuel, such as wood, which may be placed within the fire pit 222.

Should the user decide to use the grill 250, the user may return the basket 242, including the charcoal 244, to the fire pit body 224, and place the grill 250 over the fire pit body 224. The user may then adjust the height of the grilling surface depending on the size of the fire and the desired temperature, e.g., a lower position will result in a higher grilling temperature, and a higher position will result in a lower grilling temperature. A tool, such as tongs, may be used for adjusting the height of the grilling surface so as to avoid injury (e.g., burns) when adjusting the height of the grilling surface.

Although the foregoing embodiments include a frame that is adapted to be manually pulled by a user, it is contemplated that in other embodiments the frame may include a hitch, which may be attached to a bike, car, truck or RV to allow the device to be pulled by a bike, car, truck, or RV. Alternatively, the hitch and frame may be adapted to allow the device to be coupled to a car, truck or RV during use, such that the car, truck or RV supports the fire pit and/or grill above the ground during use of the same.

The recreation device may also be outfitted with other entertainment devices, such as Bluetooth speakers, a television satellite, a video display screen, lights, etc.

The particulars shown herein are by way of example only for purposes of illustrative discussion, and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A portable, gas burning multi-function recreation device comprising:
   a frame having a handle portion and two lateral support portions;
   a pair of wheels coupled to the frame;
   a fire pit coupled to the frame and positioned between the two lateral support portions of the frame at a first location, the fire pit being fluidly connectable to a gas supply for generating a fire; and
   a grill adapted for grilling food, connected to the frame and positioned between the two lateral support positions of the frame at a second location.

2. The device of claim 1, further comprising a frame support pivotally coupled to the lateral support portions of the frame and transitional relative thereto between a stowed position and a deployed position, a portion of the frame support moving away from the lateral support portions as the frame support transitions from the stowed position toward the deployed position.

3. The device of claim 1, wherein the fire pit is pivotally coupled to the frame.

4. The device of claim 3, wherein the frame is transitional between a lowered position, wherein the handle portion and the pair of wheels rest on an underlying support surface, and a raised position, wherein the handle portion is raised off the underlying support surface and the pair of wheels remaining on the underlying support surface, transition of the frame between the lowered position and the raised position urging the fire pit to pivot relative to the frame.

5. The device of claim 3, further comprising a locking element coupled to the fire pit and the frame, the locking element being adapted to selectively prevent pivotal movement of the fire pit relative to the frame.

6. The device of claim 1, wherein a grill grate is positioned over the fire pit such that heat from the fire pit is used from grilling food.

7. The device of claim 6, wherein the grill grate is moveable relative to the fire pit between a first position and a second position, the grill grate moving away from the fire pit as the grill grate moves from the first position toward the second position.

8. The device of claim 1, wherein:
   the fire pit includes a fire pit body defining a fire pit periphery;
   a grill is spaced from and positioned outside of the fire pit periphery.

9. The device of claim 8, wherein the grill is fluidly connectable to the gas supply.

10. The device of claim 1, further comprising a shelf configured to be selectively attachable to the frame and adapted to support a gas tank.

11. The device of claim 1, further comprising an ignitor adapted to ignite gas for generating the fire in the fire pit.

12. The device of claim 1, further comprising:
    a gas supply hose coupled to the fire pit and connectable to the gas supply; and
    a gas control valve in fluid communication with the gas supply hose and operative to control the supply of gas to the fire pit.

13. The device of claim 12, wherein the gas control valve is adapted to restrict gas flow to the fire pit automatically in response to the fire pit being inclined relative to the horizontal by a prescribed amount.

14. A portable gas burning multi-function recreation device comprising:
    a frame having a handle portion and two lateral support portions;
    a frame support pivotally coupled to the lateral support portions of the frame and transitional relative thereto between a stowed position and a deployed position, a portion of the frame support moving away from the lateral support portions as the frame support transitions from the stowed position toward the deployed position;
    a pair of wheels coupled to the frame; and
    a fire pit coupled to the frame and positioned between the two lateral support portions of the frame, the fire pit being adapted to allow a fire to be ignited therein;
    wherein the fire pit is coupled to the frame using a pivot which maintains the fire pit in an upright orientation when the frame support is in the slowed position, deployed position, or anywhere between.

15. The device of claim 14, further comprising a grill grate positioned over the fire pit such that heat from the fire pit is used for grilling food.

16. The device of claim 15, wherein the grill grate is moveable relative to the fire pit between a first position and a second position, the grill grate moving away from the fire pit as the grill grate moves from the first position toward the second position.

17. The device of claim 14, the device further comprising:
    a grill, wherein:

the fire pit includes a fire pit body defining a fire pit periphery;

a grill is spaced from and positioned outside of the fire pit periphery.

18. The device of claim 14, further comprising:

a gas supply hose coupled to the fire pit and connectable to a gas supply; and a gas control valve in fluid communication with the gas supply hose and operative to control the supply of gas to the fire pit.

19. The device of claim 18, wherein the gas control valve is adapted to restrict gas flow to the fire pit automatically in response to the fire pit being inclined relative to the horizontal by a prescribed amount.

* * * * *